United States Patent
Rodriguez Bellido et al.

(10) Patent No.: US 10,189,123 B2
(45) Date of Patent: Jan. 29, 2019

(54) SYSTEM FOR OUT OF AUTOCLAVE BONDED REPAIRS

(71) Applicant: AIRBUS OPERATIONS SL, Madrid (ES)

(72) Inventors: Ana Rodriguez Bellido, Madrid (ES); Jose Sanchez Gomez, Madrid (ES); Rafael Avila Dominguez, Madrid (ES); Enric Vila Papell, Madrid (ES); Rebeca Anguiano Zarranz, Madrid (ES); Juan Ignacio Forcen Carvalho, Madrid (ES)

(73) Assignee: Airbus Operations SL, Madrid (ES)

( * ) Notice: Subject to any disclaimer, the term of this patent is extended or adjusted under 35 U.S.C. 154(b) by 163 days.

(21) Appl. No.: 15/286,098

(22) Filed: Oct. 5, 2016

(65) Prior Publication Data

US 2017/0095894 A1    Apr. 6, 2017

(30) Foreign Application Priority Data

Oct. 5, 2015 (EP) .................................... 15382483

(51) Int. Cl.
| | |
|---|---|
| *B23P 6/00* | (2006.01) |
| *B23P 23/04* | (2006.01) |
| *B32B 38/00* | (2006.01) |
| *B32B 38/18* | (2006.01) |
| *B25H 1/00* | (2006.01) |
| *B29C 73/12* | (2006.01) |
| *B29C 73/26* | (2006.01) |
| *B64F 5/40* | (2017.01) |

(Continued)

(52) U.S. Cl.
CPC ................. *B23P 6/00* (2013.01); *B23P 6/002* (2013.01); *B23P 6/005* (2013.01); *B23P 23/04* (2013.01); *B25H 1/00* (2013.01); *B29C 73/12* (2013.01); *B32B 38/0004* (2013.01); *B32B 38/0012* (2013.01); *B32B 38/1808* (2013.01); *B23P 2700/01* (2013.01); *B29C 2073/264* (2013.01); *B32B 2556/00* (2013.01); *B32B 2605/18* (2013.01); *B64F 5/40* (2017.01); *Y10T 29/49726* (2015.01); *Y10T 29/49732* (2015.01); *Y10T 29/49734* (2015.01)

(58) Field of Classification Search
CPC .. B23P 6/00; B23P 6/002; B23P 6/005; B23P 23/04; Y10T 29/49726; Y10T 29/49732; Y10T 29/49734; B25H 1/02; B25H 1/08; B25H 1/005; B25H 1/0071; B29C 73/12; B32B 38/1833; B32B 38/0004; B32B 38/0012; B32B 38/1808
See application file for complete search history.

(56) References Cited

U.S. PATENT DOCUMENTS

2010/0314029 A1    12/2010    Lindgren et al.

FOREIGN PATENT DOCUMENTS

WO    2010/147733    12/2010

*Primary Examiner* — Jermie Cozart
(74) *Attorney, Agent, or Firm* — Nixon & Vanderhye P.C.

(57) ABSTRACT

A system for out of autoclave bonded repairs which including a fixing structure (1) to the composite area to be repaired, including a frame (4) and fixing parts (5, 19) attached to the frame (4), a movable structure (2) able to be attached either to the fixing structure (1) or to the patch manufacturing table (3), which includes three shafts (6, 6', 6") and three engines (7, 7', 7") configured to be able to move the tooling support in the three axes X, Y and Z, and a tooling support of either scanning tool (9), milling tool (10), patch cutting tool (11) or composite patch handle tool (11), and a patch manufacturing structure (3).

13 Claims, 6 Drawing Sheets

SYSTEM FOR OUT OF AUTOCLAVE BONDED REPAIRS

RELATED APPLICATION

This application claims the benefit of European Patent Application EP 15382483.4, filed Oct. 5, 2015, the entirety of which is incorporated by reference.

TECHNICAL FIELD

The present invention relates to machines for repairing damaged parts made of composite materials by removing damaged parts in an out of autoclave procedure.

BACKGROUND

Aircraft composite structures may have damages areas due to the impact of strikes that have to be repaired. To date, there are several technologies for repairing composite parts. The repairing process has to comprise steps for removing the parts and steps for restoring the removed part by a composite patch that may be bonded to the structure. For out of autoclave bonded repair there are known several process as Mechanical milling, Water jet or Laser techniques.

European Patent Application EP 2442941 describes a method for restoring a composite structure by removing a volume of composite material layer by layer and pausing the machine after the removal of the layer for scanning the area and replacing the volume of the structure. However, there are still needs of designing a machine able to both remove and restore the damaged part in situ in order to reduce to the maximum the handling of the composite parts.

SUMMARY

The present invention solves the above-mentioned drawbacks of the prior art by providing a system for out of autoclave in-service and production bonded repairs which comprises three parts, which are:

(i) a first fixing structure fixable to the composite damaged area to be repaired, comprising frame and fixing parts attached to the frame, (ii) a movable structure comprising a first rotating shaft connected to a first engine configured to rotate the first shaft and attached to two second fixing structures, and a tooling support attached to the first rotating shaft comprising a second rotating shaft connected to a second engine configured to rotate the second shaft and either a scanning tool, a milling tool, a patch cutting tool or a composite patch handle tool attached to the second rotating shaft.

(iii) The second fixing structures each comprise two fixing parts linked to each other through a third rotating shaft connected to a third engine configured to rotate the third shaft. The fixing parts are configured to be attached either to the frame of the fixing structure attached to the damaged part or to a patch manufacturing structure, such as a bench.

The three rotating shafts are oriented in the three axes X, Y, Z respectively according to the cartesian coordinate system for a three-dimensional space in order to move the tooling in the three axes X, Y and Z.

(iv) a patch manufacturing structure which comprises: a bench comprising platform displacement rails configured to move the platform from one side to the other of the bench, fixing means for fixing the movable structure to the bench. The platform is for laying up composite layers to form a patch. The platform may be supported by attaching means, e.g., fasteners, to mount the platform to the displacement rails of the bench. Optionally, the patch manufacturing structure includes a resin mould supported on the bench and at a side of the bench opposite the platform. Displacement mechanisms are attached to the bench to move the mould up and down. The resin mould is used to manufacture in situ a curved mould in case of curved damaged parts.

The method for removing and restoring damaged part of a composite structure by the above described machine comprises the following main steps: scan the damaged area of a part; remove the damaged area of the part; manufacture a patch equal to the mechanized area; and move the manufactured patch into the mechanized area of the part.

BRIEF DESCRIPTION OF THE DRAWINGS

Preferred embodiments of the invention are henceforth described with reference to the accompanying drawings, wherein.

DETAILED DESCRIPTION OF THE INVENTION

FIGS. 1 to 20 shows the system for out of autoclave in-service and production bonded repairs which comprise:

(i) A first fixing structure (1) to fix a tooling displacement structure (2) to a damaged area (18) of a composite material part. The first fixing structure comprising a frame (4) and fixing parts (5, 19), e.g., legs with suction pads, attached to the frame (4). The fixing structure may include vents and counterweights for applying suction to the suction pads and to balance the moveable structure over the composite material part.

(ii) A movable structure (2) comprising: a first rotating shaft (6) connected to a first engine (7) configured to rotate the first shaft (6) and attached to two second fixing structures (32, 32'); a tooling support (8) attached to the first rotating shaft (6) including a second rotating shaft (6') connected to a second engine (7') configured to rotate the second shaft (6'); and tooling (9, 10, 11, 27) such as least one of a scanning tool (9) comprising a dual scanner head, a milling tool (10), a patch cutting tool (11) and a composite patch handle tool (27) attached to the second rotating shaft (6'). The rotation of the first and second shafts move the tooling vertically and horizontally.

(iii) The second fixing structures (32, 32') each comprising fixing parts linked by a third rotating shaft (6") connected to a third engine (7") configured to rotate the third shaft (6"). The second fixing structures (32, 32') are configured to be attached to either or both the frame (4) of the first fixing structure (1) attached to the damaged part (18), and to the patch manufacturing structure (3). The two fixing structures (32, 32') may support the moveable structure (2) and the rotation of the third rotating shaft (6") moves the moveable structure horizontally.

The three rotating shafts (6, 6', 6") are oriented in the three axes X, Y, Z respectively according to the cartesian coordinate system for a three-dimensional space in order to move the tooling (9, 10, 11, 27) in the three axes X, Y and Z.

(iv) a patch manufacturing structure (3) which comprises: a bench (22) comprising platform displacement rails (31, 31') configured to move a platform (20) from one side to the other side of the bench (22); fixing parts (23, 23', 23", 23''', 30, 30') which join the fixing parts of the fixing structures (the fixing parts and fixing structures mount the movable structure (2) to the bench (22)); the platform (20) configured to receive, e.g., layering, composite layers to be formed into a patch) and attaching elements (21) to secure or mount the platform to the displacement rails (31, 31') and the bench (22), wherein the attaching elements are configured to move the platform along the displacement rails (31, 31'). Optionally, the patch manufacturing structure (3) may comprise a mould (24) located over the bench (22) and opposite to the platform (21) and displacement mechanisms (26) including a vertical rail and an engine attached to the bench (22) able to move the mould (24) up and down.

The mould is a resin mould used in case of curved damaged part in order to be used to manufacture in situ a curved mould through the milling tool (10) of the movable structure (2) according to the 3D scanned image got in the milling step of the damaged area. Once the curved mould is manufactured the composite layers are lay up over the curved mould to be cut through the cutting tool of the movable structure (2) obtaining the desired curved patch.

The method for removing and restoring damaged part of a composite structure (18) in situ out of autoclave by the above described machine comprises the following main steps: scan the damaged area, remove the scanned damaged area leaving a mechanized area in the composite part to be repaired, manufacture a patch equal to the mechanized area, lay up the patch over the mechanized area.

These steps are followed through the system described below in the following steps and substeps:

(i) Scan the damaged area, using a scanning tool mounted to the damaged area ((18) shown in FIGS. 1-4. To scan the damaged area, the first fixing structure (1) is attached to the damaged area such as by means of vacuum; assemble the movable structure (2) and fix the movable structure to the fixing structure (1) via the second fixing structures, attach a tool, such as a scanning tool (9) comprising a dual laser scanner head (12, 13), to the tooling tool support (8) of the moveable structure (2), and generate a three-dimensional (3D) digital model or image of the damaged area by moving the dual laser scanner head over the damaged area. The movement of the dual laser scanner head may be achieved by moving the tool support structure, first fixing structure and second fixing structures in a scanning pattern that covers the entirety of the damaged area. The movement can be achieved by rotation of the first, second and third shafts.

Figure 1:
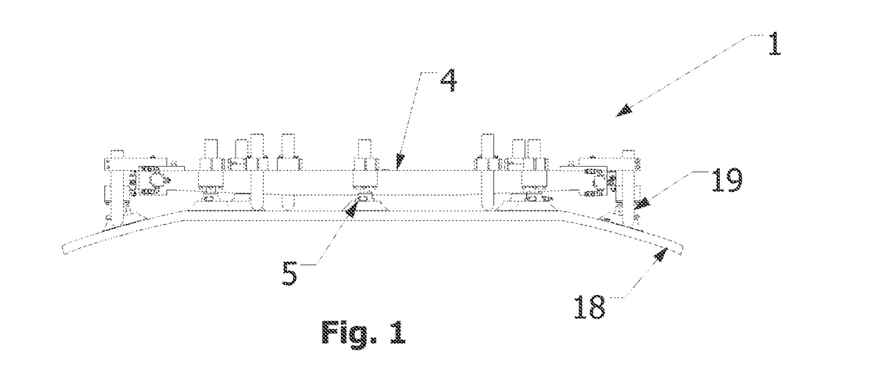
FIG. 1 shows a front view of the fixing structure fixed to the part to be repaired.
Figure 2:
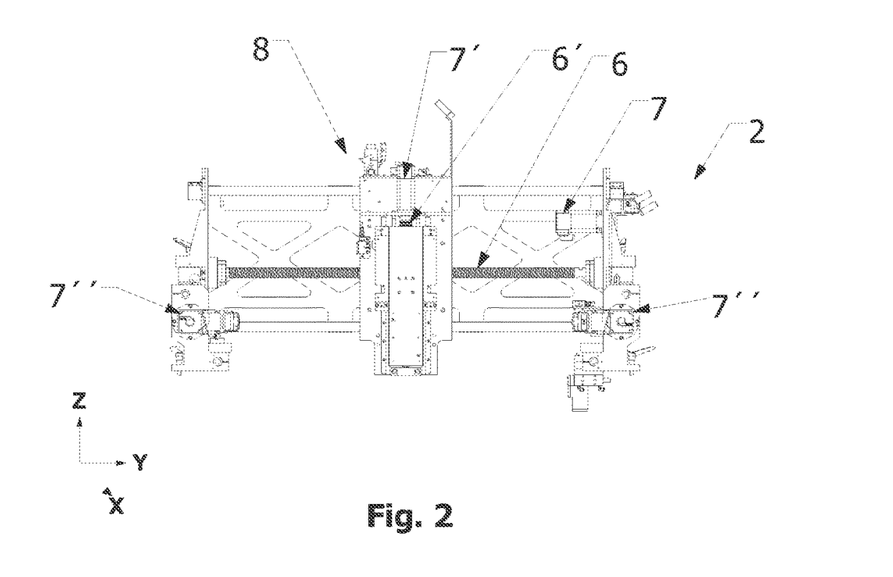
FIG. 2 shows a front view of the movable structure.
Figure 3:
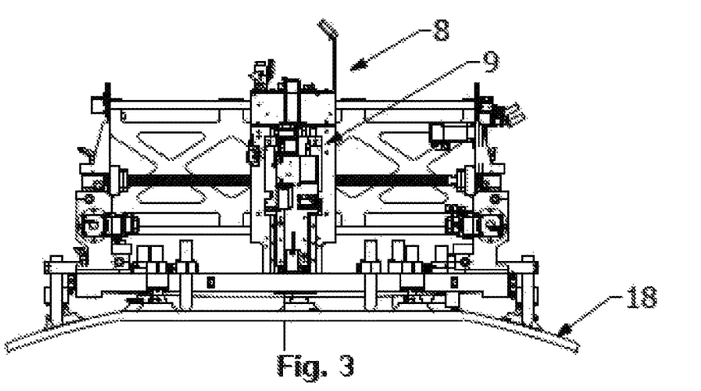
FIG. 3 shows a front view of the movable structure with a scanning tool attached to the tooling support.
Figure 4:
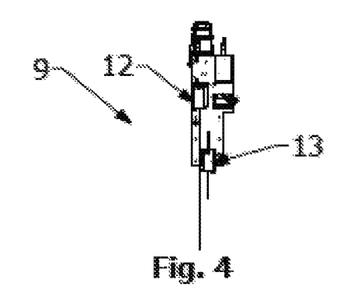
FIG. 4 shows a front view of a scanning tool.
Figure 5:
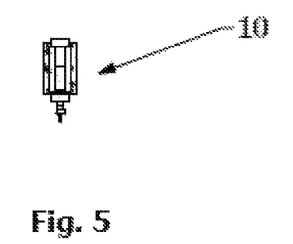
FIG. 5 shows a front view of a milling tool.
Figure 6:
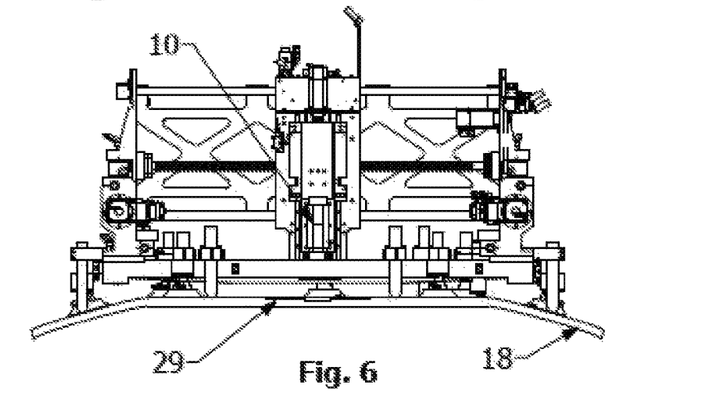
FIG. 6 shows a front view of the movable structure with the milling tool.
Figure 7:
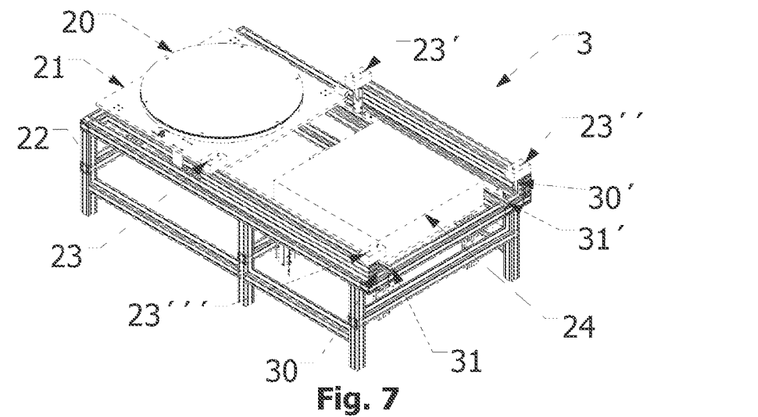
FIG. 7 shows a perspective view of the patch manufacturing bench.
Figure 8:
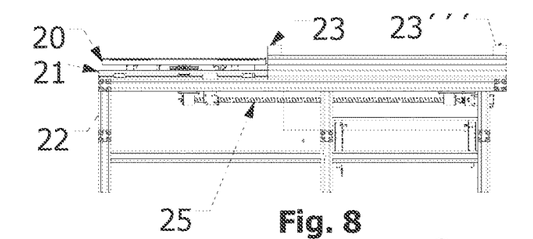
FIG. 8 shows lateral view of FIG. 7.
Figure 9:
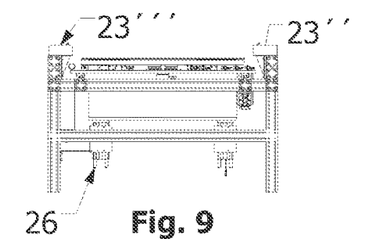
FIG. 9 shows a front view of FIG. 7.
Figure 10:
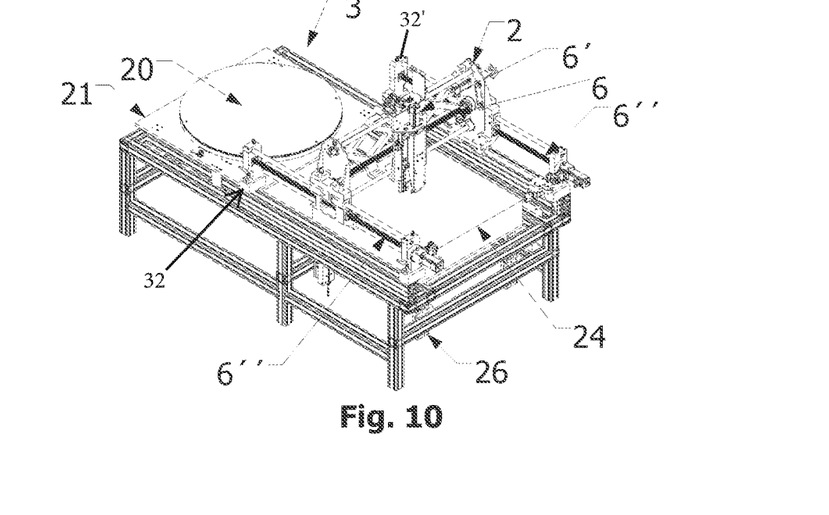
FIG. 10 shows a perspective view of the patch manufacturing bench with the movable structure and the mould in position "up".
Figure 11:
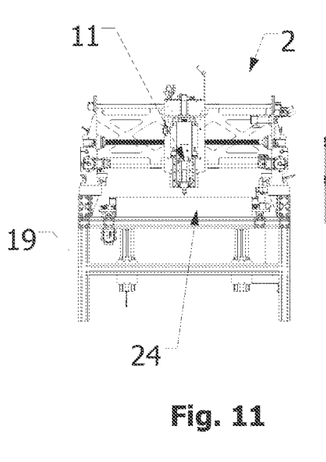
FIG. 11 shows a front view of the patch manufacturing bench with the movable structure with the cutting tool in the tooling support and the mould in position "up".
Figure 12:
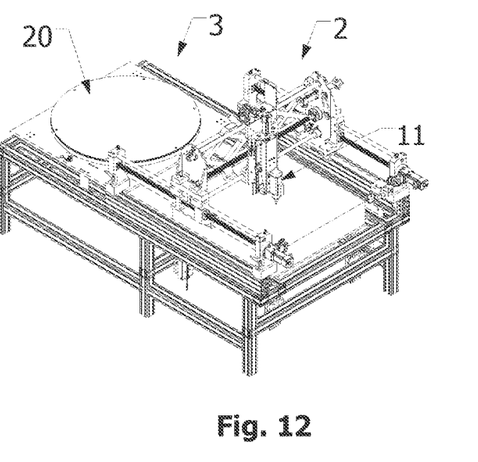
FIG. 12 shows a perspective view of FIG. 11.
Figure 13:
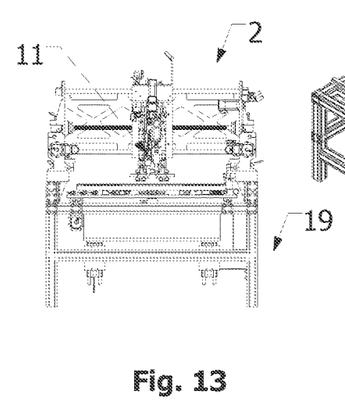
FIG. 13 shows a front view of the patch manufacturing bench with the movable structure and the movable mould in position down and the platform moved to the other side of the bench and over the mould.
Figure 14:
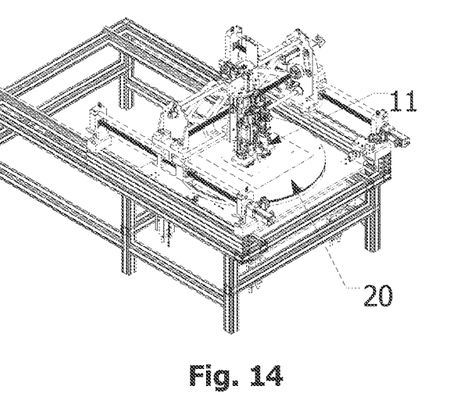
FIG. 14 shows a perspective view of FIG. 13.
Figure 15:
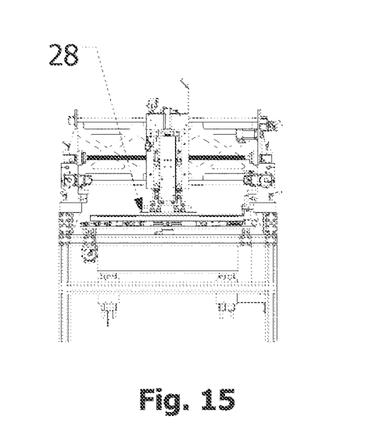
FIG. 15 shows a front view of the patch manufacturing bench with the movable structure and the movable mould in position down, the platform over the mould and the handling tool attached to the tooling support.
Figure 16:
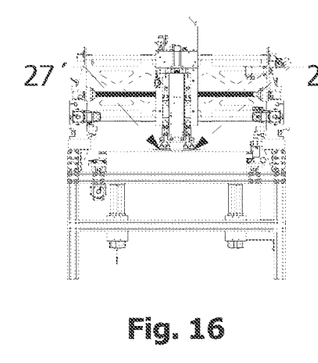
FIG. 16 shows a front view of the patch manufacturing bench with the movable structure, the movable mould in position up and the platform returned to its initial position opposite to the platform.
Figure 17:
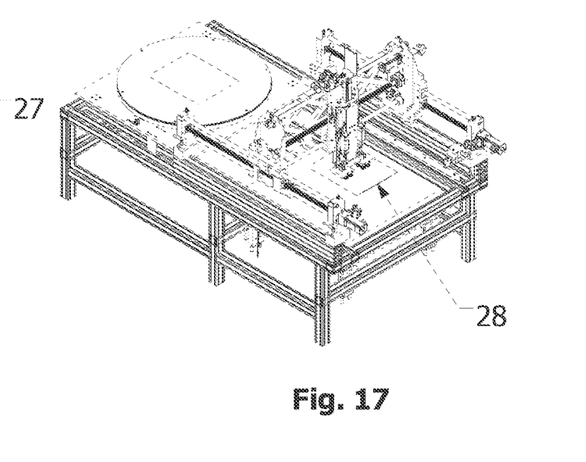
FIG. 17 shows a perspective view of FIG. 16.
Figure 18:
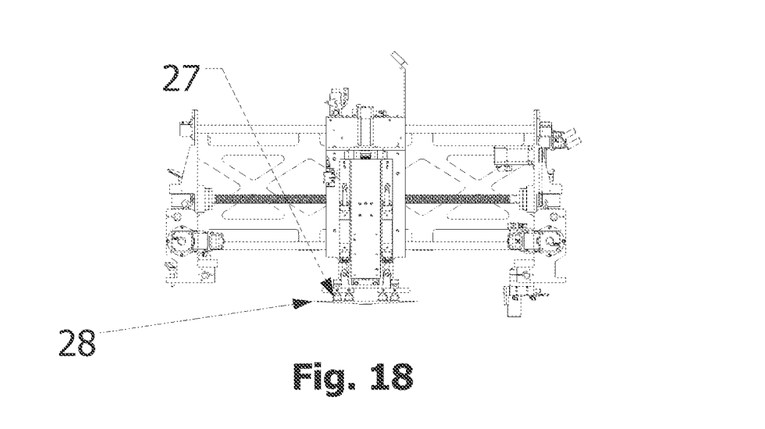
FIG. 18 shows a front view of the movable structure with the patch handled by the handle tool.
Figure 19:
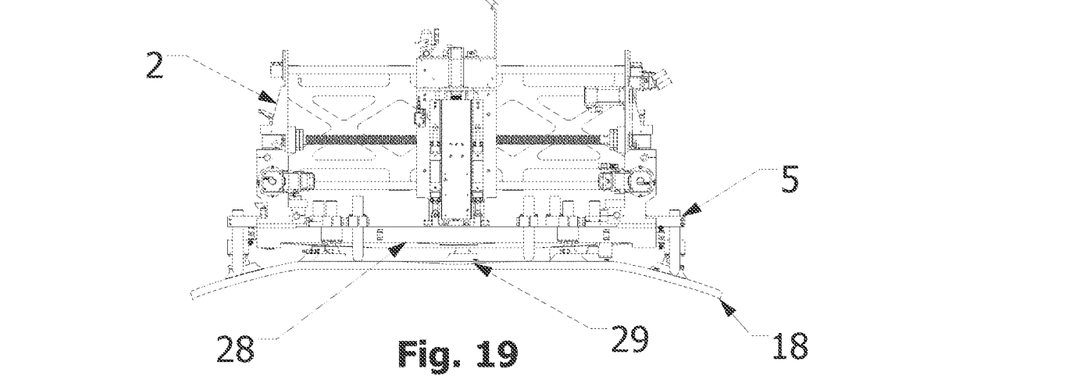
FIG. 19 shows a front view of the movable structure with the patch handled by the handle tool attached to the frame of the fixing structure.

(ii) Remove the damage area from the composite part being repaired, as shown in FIGS. 5-6. To remove the damaged area, the scanning tool (9) is removed (but need not be removed) from the tool support (8). Then, a milling tool (10) is attached to the tooling support (8) of the movable structure (2). The composite layers of the damaged area are removed by the milling tool (10) removing regions of the part. The milling tool forms a mechanized area of the part, wherein the mechanized area includes the removed damaged area. The scanning tool (9) is mounted (or may remain mounted) to the tool support (8) and a 3D digital model or image is generated by scanning the mechanized area.

(iii) Manufacture the patch equal to the mechanized area, as shown in FIGS. 7-14. The manufacture includes dismounting the movable structure (2) from the frame (4) of the first fixing structure (1) and moving the moveable structure to the patch manufacturing structure (3), this step is optional especially if there are two moveable structures where one remains over the part and the other remains mounted to the patch manufacturing structure. The first fixing structure remains fixed to the part to be repaired, by means of vacuum suction, to keep the machining references. The movable structure (2) is mounted to the patch manufacturing bench (22) and fixed through the fixing parts (23, 23', 23", 23''', 30, 30') of the patch manufacturing structure (3).

To form the patch, layers of composite material layers are arranged, e.g., laid-up, over the platform (20) or mould (24). The platform may be used to support the composite material layers if the patch is to be flat and replace a flat portion of a part. The resin mould may be used to form a curved patch to replace a curved damaged area of a part. The resin mould defines a surface shape to be formed on the patch.

A 3D digital model or image of the mechanized area to be replaced on the part may be used to create the resin mould. The milling tool may be used to form the resin mould. The composite material layers are laid on the resin mould or on the platform (20) if there is no resin mold, such as the case where the damaged part is flat. The platform (20), with the layers of composite material and resin mould (if present) are moved with the attaching means (21) along the platform displacement rails (31, 31') from one side of the bench (22) to the opposite side of the bench (22). The movable structure (2) remains fixed through the fixing parts (23, 23', 23", 23''', 30, 30').

The composite layers as laid-up on the platform or mould are cut with the patch cutting tool (11) previously attached to the tooling support (8) of the movable structure (2). The layers are cut to have the same shape and volume as the mechanized area according to the generated 3D digital model or image scanned in the removal step. The resulting cut composite layers constitutes the patch (28).

Figure 20:
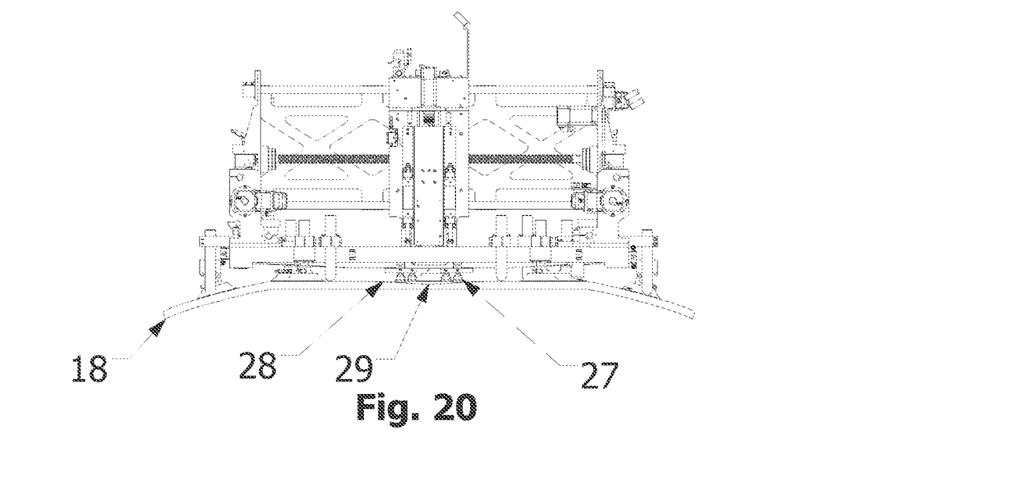
FIG. 20 shows a front view of the movable structure attached to the frame of the fixing structure wherein the patch has been placed in the mechanized area of the part.

(iv) Move the patch into the mechanized area of the repairing part, as shown in FIGS. 15-19. Remove the movable structure (2) from the bench (22) with the generated patch (28) attached by means of vents of the handle tool (27, 27') attached to the tooling support (8) of the movable structure (2). Attach the movable structure (2) with the patch (28) onto the frame (4) of the first fixing structure (1) left attached to the repairing part, and (v) Attach, such as by bonding, the patch (28) to the mechanized area of the composite structure (18) to be repaired according to the former milling reference, as shown in FIG. 20.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for out of autoclave bonded repairs comprising:
   a first fixing structure configured to be fixed to a composite damaged area to be repaired, the first fixing structure including a frame and fixing parts attached to the frame;
   a movable structure including:
      a first rotating shaft connected to a first engine configured to rotate the first rotating shaft and attached to second fixing structures,
      a tooling support attached to the first rotating shaft, wherein the tooling support includes a second rotating shaft connected to a second engine configured to rotate the second shaft, and the tooling support configured to mount tooling including at least one of a scanning tool, a milling tool, a patch cutting tool and a composite patch handle tool attached to the second rotating shaft, and
      second fixing structures each including fixing parts linked to each other through a third rotating shaft connected to a third engine configured to rotate the third shaft been the fixing parts, wherein the second fixing structures are configured to be attached to either or both the frame of the fixing structure of the damaged part and a patch manufacturing structure;
   wherein the first, second and third rotating shafts are each oriented along a different one of the three axes X, Y, Z according to a cartesian coordinate system for a three-dimensional space to move the tooling in three dimensions; and
   the patch manufacturing structure including a fixing tool configured to fix the movable structure to the patch manufacturing structure.

2. The system according to claim 1 wherein the patch manufacturing structure comprises:
   a bench comprising platform and a displacement mechanism configured to move the platform from one side to the other side of the bench, and
   a platform for laying up composite layers comprising fasteners configured to attach to the displacement mechanism of the bench.

3. The system according to claim 2 wherein the patch manufacturing structure includes a mould disposed on the bench opposite to the platform, and displacement mechanisms attached to the bench configured to move the mould up and down.

4. The system according to claim 3 wherein the mould is a resin mould.

5. The system according to claim 1 wherein the scanning tool comprises a dual laser scanner head.

6. The system according to claim 1 wherein the fixing parts attached to the frame of the fixing structure comprises vents and counterweights.

7. The system according to claim 1 wherein the patch handle tool comprises two vents for handling the patch.

8. A method for removing and restoring damaged part of a composite structure with a system comprising:
   (i) a first fixing structure including a frame and fixing parts attached to the frame;
   (ii) a movable structure including a first rotating shaft connected to a first engine configured to rotate the first rotating shaft and attached to second fixing structures;
   (ii) a tooling support attached to the first rotating shaft and including a second rotating shaft connected to a second engine configured to rotate the second shaft, wherein the second rotating shaft moves a tooling, and
   (iv) the second fixing structures each include fixing parts linked to each other through a third rotating shaft connected to a third engine configured to rotate the third shaft, wherein the second fixing structures are configured to be attached to the frame of the first fixing structure and to a patch manufacturing structure;
   wherein the first, second and third rotating shafts are each oriented along a different one of the three axes X, Y, Z according to a Cartesian coordinate system for a three-dimensional space to move the tooling in three dimensions;
   wherein the method comprises:
   attaching the fixing parts of the first fixing structure to the composite structure such that the frame of the first fixing structure is over the damaged part of the composite structure;
   mounting the moveable structure to the first fixing structure by using the second fixing structures to attach the moveable structure to the first fixing structure;
   scanning the damaged area by moving a scanning tool over the damaged area while the scanning tool is attached to the second rotating shaft and the scanning tool is moved by rotating one or more of the first, second and third shafts while the moveable structure is mounted to the first fixing structure,
   removing at least portions of the damaged area from the composite part by milling the damaged area using a milling tool while moving the milling tool which is attached to the second rotating shaft and moving the milling tool to mill the damaged area by rotating one or more of the first, second and third shafts while the moveable structure is mounted to the first fixing structure,
   unmounting the moveable structure from the first fixing structure by releasing the second fixing structures from the first fixing structure;

mounting the moveable structure to the patch manufacturing structure by using the second fixing structures to attach the moveable structure to the patch manufacturing structure;

manufacturing a patch configured to replace the scanned damaged area, by using a patch cutting tool mounted to the second rotating shaft to cut a patch from a material mounted to the patch manufacturing structure, wherein the patch cutting tool is moved by rotating one or more of the first, second and third shafts while the patch cutting tool is mounted on the second rotating shaft and while the moveable structure is mounted on the patch manufacturing structure, and attaching the patch to the mechanized area formed in the composite structure.

9. The method according to claim 8 wherein the scanning step comprises the steps of scanning though a scanning tool comprising a dual laser scanner head generating a three-dimensional (3D) image or model of the damaged area.

10. The method according to claim 8 wherein the step of removing the damaged area comprises the step of removing layers of the damaged area by using a milling tool generating a mechanized area and generating a new 3D image or model of the mechanized area.

11. The method according to claim 10 wherein the step of manufacturing the patch comprises layup composite layers over either a platform or a resin mould and cut the composite layers with the same volume as the mechanized area according to the generated 3D image or model scanned in the removal step, obtaining a patch.

12. The method according to claim 11 wherein the step of manufacturing the patch comprises manufacturing a resin mould according to the scanned mechanized area and then lay-up the composite layers over the mould.

13. A method to repair a composite material part comprising:

mounting a first fixing structure to the composite material part, wherein the first fixing structure is mounted over a damaged area of the composite material part;

attaching to the first fixing structure a moveable structure supporting a tooling support, wherein the tooling support is configured to support a scanner, a material removal tool and a patch cutting tool;

while the movable structure is attached to the first fixing structure, removing layers from the composite material part using the material removal tool held by the tooling support and being moved across the composite material part by the movable structure, wherein the removed layers include the damaged area;

scanning the composite material after removal of the layers using the scanner held by the tooling support to collect data indicative of a shape of a removed portion of the composite material by using the moveable structure to move the scanner over the composite material part;

forming a three dimensional model or image of the composite material part after removal of the layers using the collected data from the scanner, wherein the three dimensional model is representative of the removed portion of the composite material part;

detaching the movable structure from the first fixing structure and attaching the movable structure to a patch manufacturing structure;

while the movable structure is attached to the patch manufacturing structure, forming a patch having a shape corresponding to the three dimensional model by cutting the patch from a composite patch material held in the patch manufacturing structure and as the movable structure holds the patch cutting tool and moves the patch cutting tool with respect to the composite patch material; and applying the patch to the composite material part to replace the removed layers.

\* \* \* \* \*